United States Patent [19]

Wilcox

[11] 4,200,326
[45] Apr. 29, 1980

[54] REINFORCED RAILWAY WHEELS AND AXLES

[75] Inventor: Raymond J. Wilcox, Santa Monica, Calif.

[73] Assignee: Republic Corporation, Century City, Calif.

[21] Appl. No.: 861,486

[22] Filed: Dec. 19, 1977

[51] Int. Cl.$^2$ .................... B60B 3/12; B60B 17/00; B60B 35/12; B60B 37/06

[52] U.S. Cl. .................................. 295/23; 295/7; 295/15; 295/31 R; 295/34; 295/36 R; 301/63 DD; 301/124 R

[58] Field of Search ............... 295/7, 11, 15, 23, 36 R, 295/12, 13, 14, 16, 17, 18, 19, 20, 21, 22, 24, 31 R, 34; 301/37 R, 63 DD, 124 R

[56] References Cited

U.S. PATENT DOCUMENTS

| 111,862 | 2/1871 | Montgomery | 295/36 R |
|---|---|---|---|
| 175,321 | 3/1876 | Atwood | 295/11 |
| 243,007 | 6/1881 | Timby | 295/36 R |
| 1,782,285 | 11/1930 | Bourdon | 295/31 R X |
| 2,001,166 | 5/1935 | Swennes | 295/36 R X |
| 2,028,707 | 1/1936 | Smith | 295/7 |
| 2,512,186 | 6/1950 | Urschel | 295/36 R |
| 2,659,622 | 11/1953 | Watter | 295/11 |
| 3,756,646 | 9/1973 | Gimlett et al. | 295/7 |
| 3,968,996 | 7/1976 | Wilcox | 301/37 R |
| 4,000,926 | 1/1977 | Wilcox | 301/63 DD |
| 4,035,028 | 7/1977 | Wilcox | 301/63 DD X |
| 4,067,600 | 1/1978 | Knorr et al. | 295/23 |

Primary Examiner—Howard Beltran
Attorney, Agent, or Firm—Reising, Ethington, Barnard, Perry & Brooks

[57] ABSTRACT

An axle and wheel assembly particularly adapted for railcar usage is disclosed as having a metal-foam construction that is light in weight but of a relatively high strength. The axle includes an elongated hollow steel outer axle member and an elongated hollow steel inner axle member received within the outer axle member with the foam injected therebetween so as to cure and bond to the members and function as a load bearing element therebetween. Adhesion between the axle members and the foam is increased by applying an adhesive to the members prior to the injection of the foam. An intermediate portion of the outer axle member between ends of the axle includes outwardly deformed ribs that increase the cross-sectional area thereof without increasing the weight to enhance the lightweight and high strength characteristics of the axle. The wheel includes an outer skin of steel members including a pair of discs and a central hub all of which are secured to each other to define a cavity in which the foam is received and bonded to the skin. Injection of the foam for curing within the cavity or preforming of the foam and positioning thereof between the skin members may be performed to construct the wheel and, in either case, adhesive applied to the skin members secures the foam in part or totally to the skin members. An axially extending rim mounting surface on one of the discs mounts a steel wheel rim which rolls over a rail on which the wheel travels. Annular ribs formed unitary with the rim are spaced along the wheel axle and have inner ends that engage the rim surface to mount the rim while limiting heat transfer from the rim to the skin. Radially extending ribs of the discs project axially and provide strengthening of the wheel. Mounting of the wheel hub on the axle is at a mounting surface of the axle end located inwardly from a distal axle end bearing surface.

13 Claims, 5 Drawing Figures

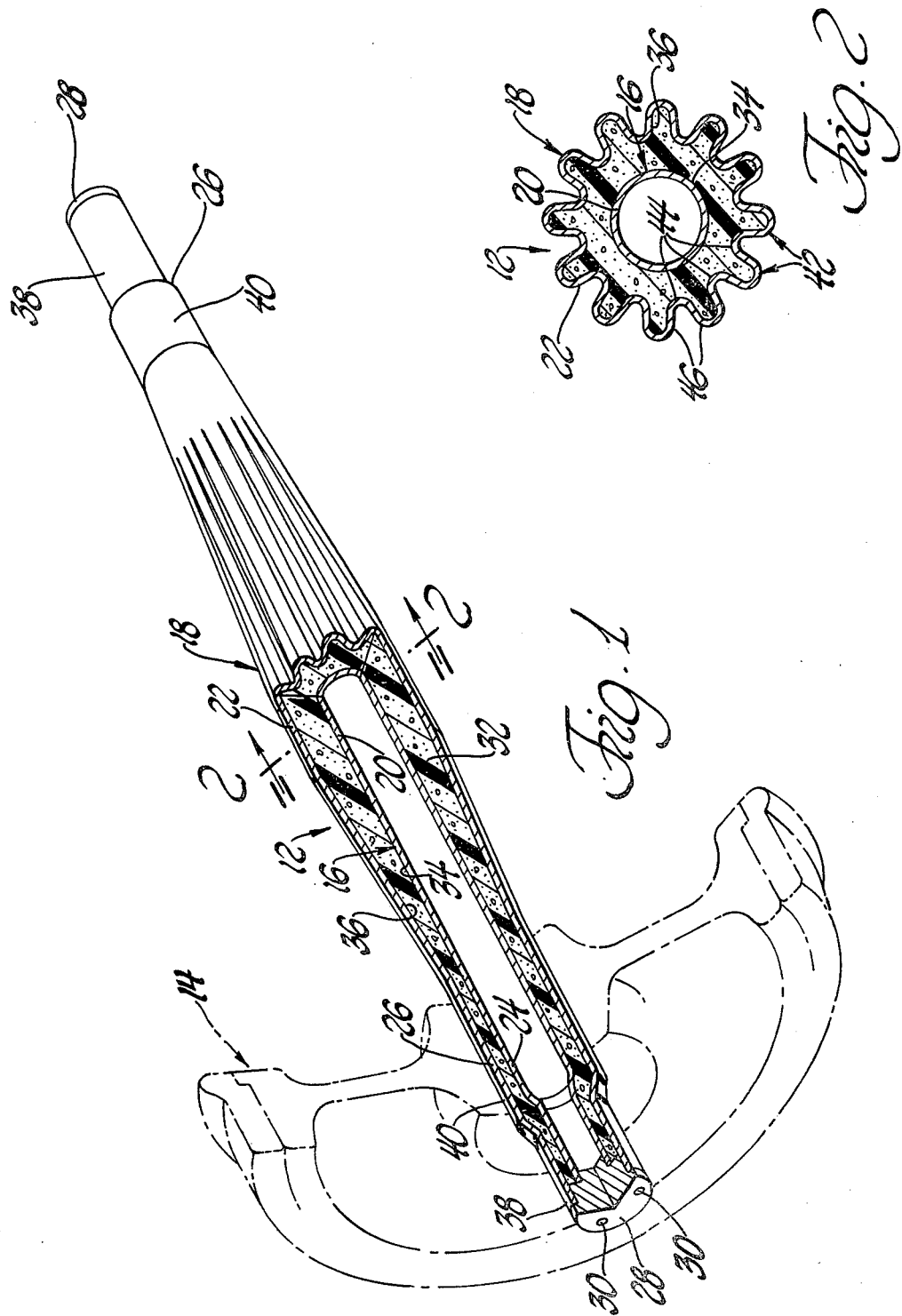

REINFORCED RAILWAY WHEELS AND AXLES

BACKGROUND OF THE INVENTION

1. Field of the Invention

This invention relates to an axle and wheel particularly adaptable for railcar usage with each other in an assembly and made from a composite metal-foam construction that has lightweight and high strength characteristics.

2. Description of the Prior Art

Most railcar axles and wheels are made of a solid construction from cast or wrought steel. Solid steel railcar axles normally have a weight between 500 and 1200 lbs. depending on the diameter and length of the axle. Solid steel railcar wheels normally have a weight between 575 lbs. and 775 lbs. depending on the wheel diameter. Since eight wheels and four associated axles are normally used to support conventional freight and passenger train cars, the weight of the wheels and axles is a considerable portion of the total car weight. Of course, heavier cars require more energy to move the cars than do lighter cars.

U.S. Pat. Nos. 3,968,996, 4,000,926; and 4,035,028 disclose vehicle wheels, wheel assemblies, and wheel components that are primarily designed for road vehicles and which are disclosed as preferably made from a composite steel-foam construction that has high strength and lightweight characteristics.

SUMMARY OF THE INVENTION

An object of the present invention is to provide an improved axle and an improved wheel which are particularly adapted for use with each other on railcars and which have metal-foam constructions that have lightweight and high strength characteristics.

In carrying out the above object, the axle includes an elongated hollow inner axle member and an elongated hollow outer axle member which receives the inner axle member. Both axle members have opposite ends located adjacent each other as well as intermediate portions extending therebetween in a spaced relationship to each other. Organic resin foam, i.e. polycarbonate or polyurethane, is injected between the inner and outer axle members and cured therebetween so as to bond to each axle member and function as a load bearing component. Steel is preferably used to form both the inner and outer axle members. An adhesive, such as epoxy, applied to the inner and outer axle members enhances the adhesion between the foam and the members so as to increase the load carrying capacity of the axle.

The steel-foam axle is particularly adaptable for use on railcars and has the intermediate portion of its outer axle member formed with a larger cross-sectional area than the ends thereof to provide increased axle strength in a bending mode. Longitudinally extending ribs in the intermediate portion of the outer axle member are spaced circumferentially from each other to provide this larger cross-sectional area at the intermediate portion of the axle. Each rib is formed by an outward deformation of the outer axle member intermediate portion in a manner that provides its greater cross-sectional area without requiring increased size and associated weight of the outer axle member. Each axle end includes a distal bearing surface and a wheel mounting surface spaced toward the intermediate axle portion from the bearing surface.

The railcar wheel of this invention includes a plurality of metallic members secured to each other to define an enclosed cavity and an outer skin of the wheel. The skin members include a central hub surface for mounting the wheel and an annular rim mounting surface that faces outwardly from the central wheel axis. Organic resin foam, i.e. polycarbonate or polyurethane, is received within the skin cavity and bonded to the metallic skin members to function as a load bearing element. A metallic rim mounted on the rim mounting surface of the skin includes an outwardly facing annular surface that rolls over a rail on which the wheel travels. Annular ribs of the rim are spaced along the central wheel axis and mount the rim on the rim mounting surface of the skin while limiting heat transfer thereto from the rim. Steel is preferably used to form the rim with a unitary construction incorporating the ribs which have inner ends that engage the rim mounting surface of the skin to provide the mounting of the rim.

In its preferred embodiment, the railcar wheel includes a pair of steel discs and a central hub that comprise the skin members defining the cavity which receives the foam. The foam may be injected into the cavity for curing after securement of the skin members to each other or, alternately, may be preformed and positioned between the skin members as the skin members are secured to each other. An adhesive, such as expoxy, is applied to the steel skin members to enhance the adhesion between the foam and the skin members when the foam is injected and to provide the total adhesion when the foam is preformed. The steel hub includes an inwardly facing hub surface for mounting the wheel and one of the discs has an axially extending portion that defines the annular rim mounting surface which faces outwardly from the central wheel axis to engage and mount inner ends of the steel rim ribs. Each disc includes radially extending ribs that project axially therefrom along the central wheel axis to provide strengthening of the wheel. In one preferred construction, the steel discs include radially extending flanges secured to each other at one axial extremity of the rim mounting surface. In another preferred construction, the steel discs include axially extending portions secured to each other at one axial extremity of the rim mounting surface.

The metal-foam axle is preferably used with the metal-foam wheel to provide a lightweight and high strength assembly for use on railcars. Mounting of the wheel hub, preferably by a heat shrink operation, on the axle end mounting surface inwardly from the distal bearing surface thereof allows the assembly to be used with conventional railcar axle journals. Bending loads applied to the axle and wheel are carried by the injected foam adhesively bonded to both the outer and inner axle members. In carrying this load, the increased cross-sectional area of the intermediate axle portion defined by the outwardly deformed longitudinal ribs provides the requisite high strength characteristics without any additional weight.

The objects, features, and advantages of the present invention are readily apparent from the following detailed description of the preferred embodiments taken in accordance with the accompanying drawings.

BRIEF DESCRIPTION OF THE DRAWINGS

FIG. 1 is a perspective view showing an axle of this invention in solid line representation partially broken away and showing a wheel of the invention in phantom line representation positioned for use on the axle as an assembly;

FIG. 2 is a cross-sectional view of the axle taken along line 2—2 of FIG. 1;

DETAILED DESCRIPTION OF THE PREFERRED EMBODIMENTS

Figure 3:
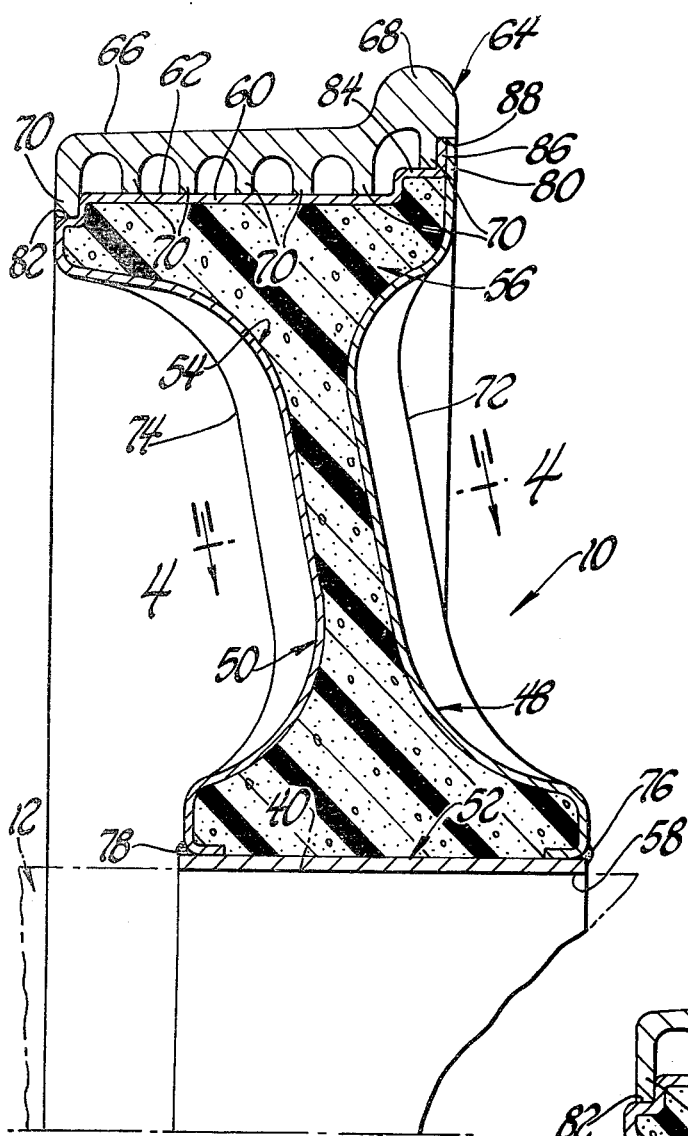
FIG. 3 is a half-sectional view of one embodiment of the wheel taken along a radial plane that extends through the central wheel axis.

Referring to FIG. 1, an axle and wheel assembly indicated collectively by reference numeral 10 includes an axle 12 shown by solid line representation and a wheel 14 shown by phantom line representation. Axle 12 and wheel 14 are each made from a metallic-foam construction, as will be more fully hereinafter described, and have lightweight and high strength characteristics such that the assembly is particularly adaptable for use on railcars.

Axle 12 as seen by combined reference to FIGS. 1 and 2 includes an elongated hollow inner axle member 16 and an elongated hollow outer axle member 18 in which the inner axle member is received. Inner and outer axle members 16 and 18 have respective intermediate portions 20 and 22 as well as respective opposite ends 24 and 26 located adjacent each other in associated pairs with the intermediate portions extending between the ends. Steel axle end inserts 28 space the inner and outer axle members from each other and have holes 30 through which a suitable organic resin foam 32, such as polycarbonate or polyurethane foam, is injected between the axle members for curing and accompanying bonding to each axle member. The bonding between the foam 32 and each of the axle members 16 and 18 during the curing makes the foam function as a load bearing element.

Each of the axle members 16 and 18 is preferably made from steel which has a thickness of approximately 3/16 of an inch. An adhesive, such as an epoxy, is applied to the outer surface 34 of the inner axle member 16 and to the inner surface 36 of the outer axle member 18 prior to the foam injection so as to enhance the subsequent adhesion which takes place between the foam and the axle members.

Each end of the axle 12 shown in FIG. 1 has the outer axle member 18 provided with a distal bearing surface 38 of a round shape and a wheel mounting surface 40 also of a round shape located toward the intermediate portion 22 of the outer axle member from the adjacent bearing surface. Intermediate portion 22 of the outer axle member 18 has a larger cross-sectional area than at the axle ends to enhance bending strength of the axle when it is supported on the bearing surfaces 38 with a pair of the wheels 14 mounted on the wheel mounting surfaces 40. Longitudinal ribs 42 extending along the elongated direction of the axle spaced circumferentially from each other provide the greater cross-sectional area of the intermediate portion 22 of the outer axle member 18. Each rib 42 has spaced inner ends 44 shared with its neighboring ribs and an outwardly deformed intermediate rib portion 46 between its ends for defining the increased cross-sectional area without requiring the blank formed into the outer axle member to have increased size and corresponding increased weight. These outwardly deformed ribs 42 are preferably formed by first positioning the outer axle member 18 within a closed die having a ribbed cavity and by then injecting fluid under pressure into the interior of the outer axle member to cause the outward rib formation.

Rail wheel 14 shown schematically in FIG. 1 mounted on axle 12 is shown further in FIG. 3 with the axle shown by schematic phantom line representation extending along a central axis A of the wheel and the axle. A plurality of steel skin members of wheel 14 are preferably comprised by inner and outer discs 48 and 50, respectively, and a central hub 52 which are secured to each other to provide an outer wheel skin that defines an enclosed cavity 54. Organic resin foam 56, which is preferably polycarbonate foam or polyurethane foam, is received within and completely fills the cavity 54 adhesively bonded to the steel skin members so as to function as a load bearing element. Central hub 52 of the wheel skin includes a round inwardly facing surface 58 for mounting the wheel on the axle mounting surface 40, preferably by a heat shrink operation wherein the wheel hub is heated prior to inserting the unheated axle therethrough and then subsequently cooling the wheel so that an interference fit is present at the engaged axle and wheel surfaces 40 and 58. Outer disc 50 includes an axially extending rim mounting portion 60 that defines an annular rim mounting surface 62 which faces in an outward direction from the central wheel axis A. A metallic rim or flanged tire 64 is mounted on the disc portion 60 and has an annular outer surface 66 that rolls over a rail on which the wheel is traveling guided by an annular flange 68 of a larger diameter at its inboard end. Rim 64 includes annular ribs 70 formed in a unitary construction therewith spaced along the central wheel axis A. Inner ends of the ribs 70 are engaged with the mounting surface 62 of the skin outer disc 50 preferably by an interference fit achieved via a heat shrink mounting operation wherein the rim is first heated and then receives the wheel skin prior to being cooled and shrunk about the surface 62. Ribs 70 limit the heat transfer from the rim 64 to the inner and outer discs 48 and 50 of the wheel skin as well as limiting heat transfer to the foam 56 within the skin cavity 54.

Foam 56 within the skin cavity 54 of the wheel 14 shown in FIG. 3 can be formed in one of two ways. After securing the discs 48 and 50 to each other and to the hub 52, a suitable opening to the enclosed cavity 54 is provided in order to inject the foam into the cavity to fill the cavity and cure therein for bonding to the inner surfaces defining the cavity. A suitable adhesive, such as an epoxy, can be applied to the inner surfaces defining the cavity 54 prior to the injection of the foam so as to increase the adhesion between the foam and the steel members of the wheel skin as the foam cures. As an alternative to the foam injection construction, the foam 56 may be cast as a preform and placed between the inner and outer discs 48 and 50 prior to securement thereof to each other and to the hub 52. An adhesive such as the epoxy previously mentioned is applied to the surfaces defining the cavity 54 before the securement of the disc and hub to each other in order to provide the adhesion between the foam and the cavity surfaces in the finally assembled wheel.

Figure 4:
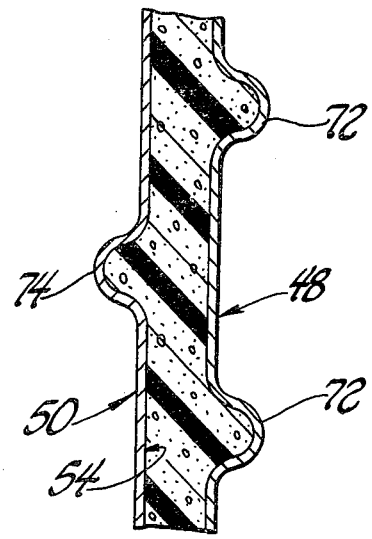
FIG. 4 is a sectional view through the wheel taken along line 4—4 of FIG. 3 illustrating radial ribs that project axially.

As seen by combined reference to FIGS. 3 and 4, the inner and outer wheel discs 48 and 50 include ribs 72 and 74, respectively, that extend radially relative to the wheel axis A at a slightly inclined orientation along the axis. Ribs 72 alternate with the ribs 74 moving in a circumferential direction as shown in FIG. 4 and project axially in opposite directions so as to strengthen the wheel construction. At their inner ends, ribs 72 and 74 extend in opposite axial directions at a hub portion of the wheel which has a greater axial extent than the wheel has at the radially intermediate portion of the ribs. Welds 76 and 78 respectively secure the inner and outer discs 48 and 50 to opposite ends of the hub 52 adjacent the inner ends of the ribs 72 and 74. At their radially outer ends, the ribs 72 and 74 also extend in opposite axial directions from each other in the area of a rib mounting portion of the wheel. Rib 72 has a radially extending flange 80 located adjacent the rim flange 68 that provides guiding on a rail at the inboard wheel side. The outer end of rib 74 is formed unitary with the rim mounting portion 60 by a suitable forming operation. One axial extremity or end of rim mounting portion 60 includes a smaller diameter annular groove 82 that receives the rim rib 70 at the opposite end of the rim from the flange 68. The other axial extremity or end of the rim mounting portion 60 includes a larger diameter step 84 that mounts the rib 70 adjacent the rim end having the guide flange 68. A radially extending flange 86 projects outwardly from the step 84 and is secured to the flange 80 of the inner disc by suitable spot welding operations. Flanges 80 and 86 are located within an inner groove 88 of the rim flange 68.

Axle and wheel assembly 10 shown in FIGS. 1 and 3 is particularly adaptable for use on railcars due to its high strength and lightweight characteristics. Manufacturing of the axle and wheel involved can be performed economically due to the metal-foam construction of both the axle and the wheel. The high strength and lightweight characteristics are achieved by the adhesive bonding of the foam to the associated metal components so that the foam functions as a load bearing element in both the axle and the wheel.

Figure 5:
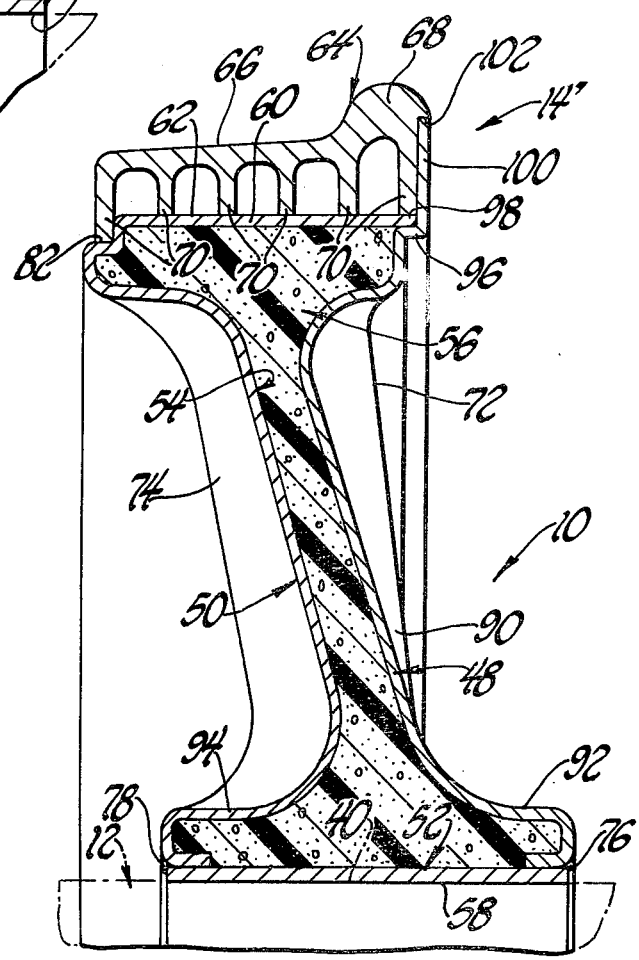
FIG. 5 is a partial half-sectional view similar to FIG. 3 of another preferred embodiment of the wheel.

With reference to FIG. 5, the wheel and axle assembly 10 includes an axle 12 identical to the axle previously described and a wheel 14' similar to the wheel 14 of FIG. 3 such that like reference numerals are applied thereto and the previous description is applicable to this wheel as well except as will be noted. Each radial rib 72 of the inner disc 48 has its inner end 90 terminating outwardly from the axially projecting inner disc hub portion 92 that is secured to the hub 52 by weld 76. Hub portion 92 has a more pronounced axially extending configuration at the inner extremity of the inner disc 48 as does the corresponding outer disc hub portion 94 which projects axially in the opposite direction secured to the hub by the weld 78. At its outer extremity, the inner disc 48 has an axially extending portion 96 which is secured to the axial extremity or end portion 98 of the outer disc mounting portion 60 by a suitable spot weld. An annular flange 100 extends radially in an outward direction from inner disc portion 96 and is received within an annular groove 102 of the rim 64 adjacent the flange 68 which guides the rim over a rail at the inboard side of the wheel.

While preferred embodiments of the axle, wheel, and the axle and wheel assembly have herein been described in detail, various alternative designs and embodiments for practicing the present invention are defined by the following claims.

What is claimed is:

1. A vehicle axle comprising: an elongated hollow inner axle member made from a metallic material and having opposite ends as well as an intermediate portion extending therebetween; an elongated hollow outer axle member made from a metallic material and having opposite ends as well as an intermediate portion extending therebetween; said intermediate portion of the outer axle member including longitudinal ribs of a generally uniform wall thickness spaced circumferentially from each other; each rib including circumferentially spaced inner ends and an outwardly extending intermediate rib portion; said inner axle member being received within said outer axle member in a spaced relationship thereto with the ends of the axle members located adjacent each other in associated pairs; and foam located between the inner and outer axle members and bonded to each axle member so as to provide a load bearing element therebetween.

2. A vehicle axle comprising: an elongated hollow inner axle member made of steel and having opposite ends as well as an intermediate portion extending therebetween; an elongated hollow outer axle member made of steel and having opposite ends as well as an intermediate portion extending therebetween; said intermediate portion of the outer axle member including longitudinal ribs of a generally uniform wall thickness spaced circumferentially from each other; each rib including circumferentially spaced inner ends and an outwardly extending intermediate rib portion; said inner axle member being received within said outer axle member in a spaced relationship thereto with the ends of the axle members located adjacent each other in associated pairs; adhesive on the inner and outer axle members; and foam located between the inner and outer axle members and bonded to each axle member in part by the adhesive in order to provide a load bearing element between the axle members.

3. A vehicle axle comprising: an elongated hollow inner axle member made of steel and having opposite ends as well as an intermediate portion extending therebetween; an elongated hollow outer axle member made of steel and having opposite ends as well as an intermediate portion extending therebetween; said intermediate portion of the outer axle member having a larger cross-sectional area than the ends thereof; said intermediate portion of the outer axle member including longitudinal ribs of a generally uniform wall thickness spaced circumferentially from each other; each rib including circumferentially spaced inner ends and an outwardly extending intermediate rib portion; said inner axle member being received within said outer axle member in a spaced relationship thereto with the ends of the axle members located adjacent each other in associated pairs; and foam located between the inner and outer axle members and bonded to each axle member so as to provide a load bearing element therebetween.

4. A railcar axle comprising: an elongated hollow inner axle member made of steel and having opposite ends as well as an intermediate portion extending therebetween; an elongated hollow outer axle member made of steel and having opposite ends as well as an intermediate portion extending therebetween; each end of the outer axle member including a distal bearing surface and a wheel mounting surface spaced toward the intermediate axle portion from the bearing surface; the intermediate portion of the outer axle member having outwardly extending longitudinal ribs of a generally uniform wall thickness spaced circumferentially from each other; each rib including circumferentially spaced inner ends and an outwardly extending intermediate rib portion; said inner axle member being received within said outer axle member in a spaced relationship thereto with the ends of the axle members located adjacent each other in associated pairs; adhesive on the inner and outer axle members; and foam located between the inner and outer axle members and bonded to each axle member in part by the adhesive in order to provide a load bearing element between the axle members.

5. A rail wheel comprising: a plurality of metallic members secured to each other to define an enclosed cavity and an outer skin of the wheel; said skin members including a central hub surface for mounting the wheel on an axle and an annular rim mounting surface that faces outwardly from the central wheel axis; foam located within the cavity and bonded to the metallic skin members so as to provide a load bearing element therebetween; and a metallic tire mounted on the rim mounting surface of the outer skin and including an outwardly extending annular flange and an outwardly facing annular surface for rolling over a rail on which the wheel travels, said tire also including annular ribs spaced along the central wheel axis extending inwardly with respect thereto and engaged with the rim mounting surface so as to mount the tire on the rim mounting surface of the skin while limiting heat transfer thereto from the tire.

6. A rail wheel comprising: a plurality of steel members secured to each other to define an enclosed cavity and an outer skin of the wheel; said steel skin members including a central hub surface for mounting the wheel on an axle and an annular rim mounting surface that faces outwardly from the central wheel axis; foam located within the cavity and bonded to the metallic skin members so as to provide a load bearing element therebetween; and a steel tire mounted on the rim mounting surface of the outer skin and including an outwardly extending annular flange and an outwardly facing annular surface for rolling on a rail over which the wheel travels, said tire also including annular ribs unitary therewith spaced along the central wheel axis extending inwardly with respect thereto and having inner rib ends that engage the rim mounting surface to mount the tire while limiting heat transfer from the tire to the skin.

7. A rail wheel comprising: a plurality of steel members including a pair of discs and a central hub secured to each other to define an enclosed cavity and an outer skin of the wheel; said hub including an inwardly facing hub surface for mounting the wheel on an axle; one of said discs including an annular rim mounting surface that faces outwardly from the central wheel axis; adhesive on the discs and the hub within the cavity; foam located within the cavity and bonded to the discs and the hub at least in part by the adhesive so as to provide a load bearing element therebetween; and a unitary steel tire including an outwardly extending annular flange and an outwardly facing annular surface for rolling on a rail over which the wheel travels, said tire including annular ribs formed unitary therewith spaced along the central wheel axis extending inwardly with respect thereto and having inner rib ends that mount the tire on the rim mounting surface of said one disc while limiting heat transfer thereto from the tire.

8. A wheel as in claim 7 wherein the discs each include radial ribs that project axially therefrom along the central wheel axis.

9. A wheel as in claim 7 wherein the steel discs include radially extending flanges secured to each other at one axial extremity of the rim mounting surface on the one disc.

10. A wheel as in claim 7 wherein the steel discs include axially extending portions secured to each other at one axial extremity of the rim mounting surface on the one disc.

11. An axle and wheel assembly for use on railcars, the assembly comprising: an axle including an elongated hollow inner axle member made from a metallic material and having opposite ends as well as an intermediate portion extending therebetween, an elongated hollow outer axle member made from a metallic material and having opposite ends as well as an intermediate portion extending therebetween, said intermediate portion of the outer axle member including longitudinal ribs of a generally uniform wall thickness spaced circumferentially from each other, each rib including circumferentially spaced inner ends and an outwardly extending intermediate rib portion, said inner axle member being received within said outer axle member in a spaced relationship thereto with the ends of the axle members located adjacent each other in associated pairs to provide axle ends, foam located between the inner and outer axle members and bonded to each axle member so as to provide a load bearing element therebetween; and a wheel including a plurality of metallic skin members secured to each other to define an enclosed cavity and an outer skin of the wheel, said skin members including a central hub surface for mounting the wheel on one end of the axle and an annular rim mounting surface that faces outwardly from the axle, foam located within the cavity and bonded to the metallic skin members to provide a load bearing element therebetween, a metallic tire mounted on the rim mounting surface of the outer skin and including an outwardly extending annular flange and an outwardly facing annular surface for rolling on a rail over which the wheel travels, and said tire also including annular ribs spaced along the central wheel axis extending inwardly with repect thereto so as to mount the tire on the rim mounting surface of the skin while limiting heat transfer thereto from the tire.

12. An axle and wheel assembly for use on railcars, the assembly comprising: an axle including an elongated hollow inner axle member made of steel and having opposite ends as well as an intermediate portion extending therebetween, an elongated hollow outer axle member made of steel and having opposite ends as well as an intermediate portion extending therebetween, said intermediate portion of the outer axle member including longitudinal ribs of a generally uniform wall thickness spaced circumferentially from each other, each rib including circumferentially spaced inner ends and an outwardly extending intermediate rib portion, said inner axle member being received within said outer axle member in a spaced relationship thereto with the ends of the axle members located adjacent each other in associated pairs to provide axle ends, adhesive on the inner and outer axle members, and foam located between the inner and outer axle members and bonded to each axle member in part by the adhesive in order to provide a load bearing element between the axle members; and a wheel including a plurality of steel skin members secured to each other to define an enclosed cavity and an outer skin of the wheel, said steel skin members including a central hub surface for mounting the wheel on one end of the axle and an annular rim mounting surface that faces outwardly from the axle, adhesive on the steel skin members within the cavity defined thereby, foam located within the cavity and bonded to the metallic skin members at least in part by the adhesive in order to provide a load bearing element between the skin members, a steel tire mounted on the rim mounting surface of the outer skin and including an outwardly extending annular flange and an outwardly facing annular surface for rolling on a rail over which the wheel travels, and said tire also including annular ribs unitary therewith spaced along the central wheel axis extending inwardly with respect thereto and having inner rib ends that engage the rim mounting surface of the skin to mount the tire while limiting heat transfer from the tire to the skin.

13. An axle and wheel assembly for use on railcars, the assembly comprising: an axle including an elongated hollow inner axle member made of steel and having opposite ends as well as an intermediate portion extending therebetween, an elongated hollow outer axle member made of steel and having opposite ends as well as an intermediate portion extending therebetween, said intermediate portion of the outer axle member having outwardly projecting and longitudinally extending ribs of a generally uniform wall thickness spaced circumferentially from each other, each rib including circumferentially spaced inner ends of an outwardly extending intermediate rib portion, said inner axle member being received within said outer axle member in a spaced relationship thereto with the ends of the axle members located adjacent each other in associated pairs to provide axle ends, adhesive on the inner and outer axle members, foam located between the inner and outer axle members and bonded to each axle member in part by the adhesive in order to provide a load bearing element therebetween; and a wheel having steel skin members including a pair of discs and a central hub secured to each other to define an enclosed cavity and an outer skin of the wheel, said hub including an inwardly facing hub surface for mounting the wheel on one end of the axle, one of said discs having an annular rim mounting surface that faces outwardly from the axle, adhesive on the skin members within the cavity, foam located within the cavity and bonded to the steel skin members in part by the adhesive in order to provide a load bearing element between the skin members, a unitary tire including an outwardly extending annular flange and an outwardly facing annular surface for rolling on a rail over which the wheel travels, and said tire also including annular ribs formed unitary therewith spaced along the central wheel axis extending inwardly with respect thereto and having inner rib ends that mount the tire on the rim mounting surface of said one disc while limiting heat transfer thereto from the tire.

* * * * *